(12) United States Patent
Gorena Jean et al.

(10) Patent No.: US 12,414,671 B2
(45) Date of Patent: Sep. 16, 2025

(54) LOOFAH DISH SPONGE AND METHODS OF MANUFACTURING THEREOF

(71) Applicants: Alfonso Ramon Gorena Jean, Laredo, TX (US); Rodrigo Maldonado de Hoyos, Monterrey (MX); Kendra Jean Sutherland, Hampton, GA (US)

(72) Inventors: Alfonso Ramon Gorena Jean, Laredo, TX (US); Rodrigo Maldonado de Hoyos, Monterrey (MX); Kendra Jean Sutherland, Hampton, GA (US)

( * ) Notice: Subject to any disclaimer, the term of this patent is extended or adjusted under 35 U.S.C. 154(b) by 391 days.

(21) Appl. No.: 18/144,120

(22) Filed: May 5, 2023

(65) Prior Publication Data
US 2024/0138650 A1  May 2, 2024

Related U.S. Application Data

(63) Continuation-in-part of application No. 17/099,495, filed on Nov. 16, 2020, now abandoned.

(51) Int. Cl.
| | |
|---|---|
| *A47L 17/08* | (2006.01) |
| *B32B 3/04* | (2006.01) |
| *B32B 7/09* | (2019.01) |
| *B32B 9/02* | (2006.01) |
| *B32B 9/04* | (2006.01) |
| *B32B 37/18* | (2006.01) |
| *B32B 38/00* | (2006.01) |

(52) U.S. Cl.
CPC ............... *A47L 17/08* (2013.01); *B32B 3/04* (2013.01); *B32B 7/09* (2019.01); *B32B 9/02* (2013.01); *B32B 9/04* (2013.01); *B32B 37/18* (2013.01); *B32B 38/0004* (2013.01); *B32B 2038/008* (2013.01); *B32B 2250/03* (2013.01); *B32B 2307/7376* (2023.05); *B32B 2309/105* (2013.01); *B32B 2317/10* (2013.01); *B32B 2432/00* (2013.01)

(58) Field of Classification Search
CPC .................................. A47K 7/02; A47L 13/16
USPC .................................. 15/244.1, 244.3, 244.4
See application file for complete search history.

(56) References Cited

U.S. PATENT DOCUMENTS

| | | | |
|---|---|---|---|
| 720,890 A * | 2/1903 | Campbell | ............... A47L 13/16 15/244.4 |
| 2,544,216 A * | 3/1951 | Brackmann | ............ A47K 7/022 D28/63 |

* cited by examiner

*Primary Examiner* — Tom Rodgers
(74) *Attorney, Agent, or Firm* — Boris Leschinsky

(57) ABSTRACT

A method for manufacturing a loofah dish sponge includes cutting a first cover layer and a second cover layer from the dried-out fibrous loofah skeleton, positioning a slightly smaller sized inner layer in between the first and second cover layers with their respective external sides facing outward and away from the internal layer, deforming and sewing the peripheral edges of the first and second cover layers together, thereby forming an internal volume in between thereof allowing the inner layer placed inside to freely "float" in this space. The sponge is made without using any synthetic materials. It features superior durability, improved ergonomics, impedes mold growth after use and is fully compostable.

10 Claims, 8 Drawing Sheets

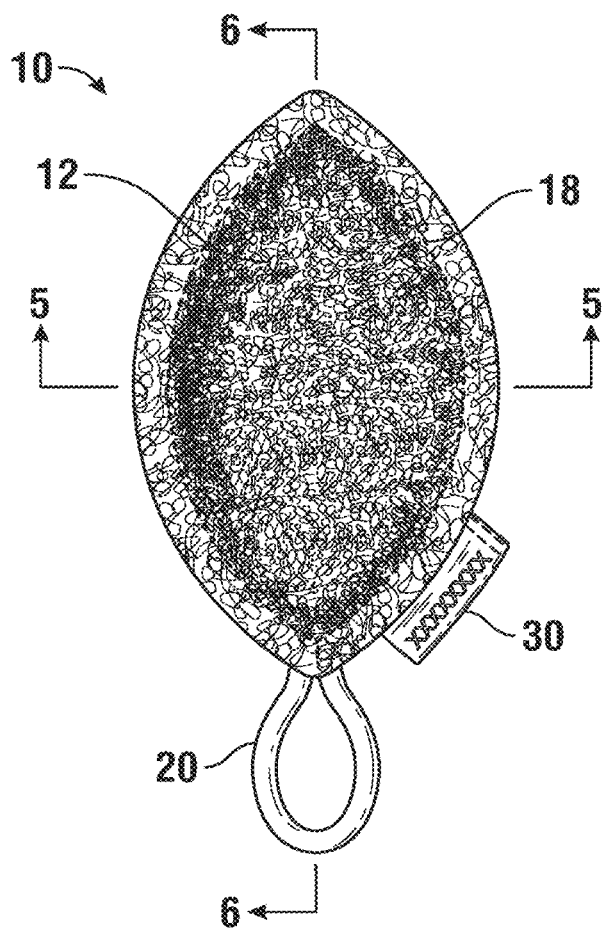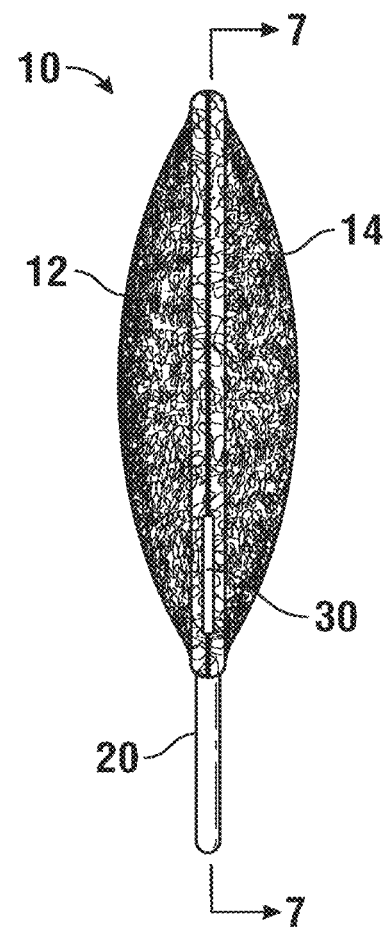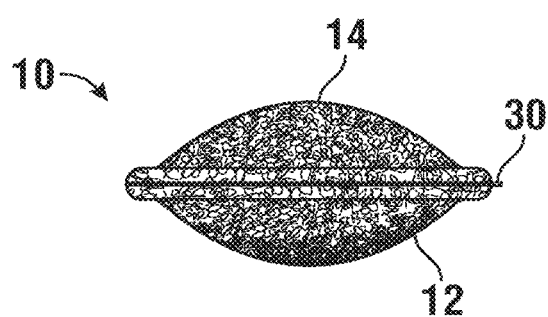

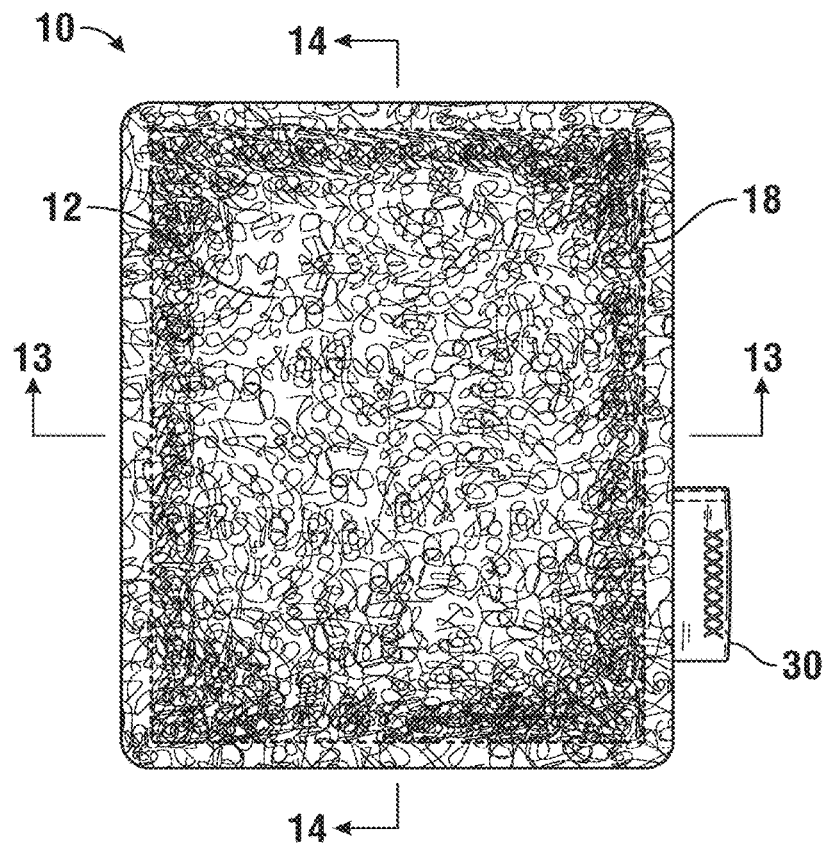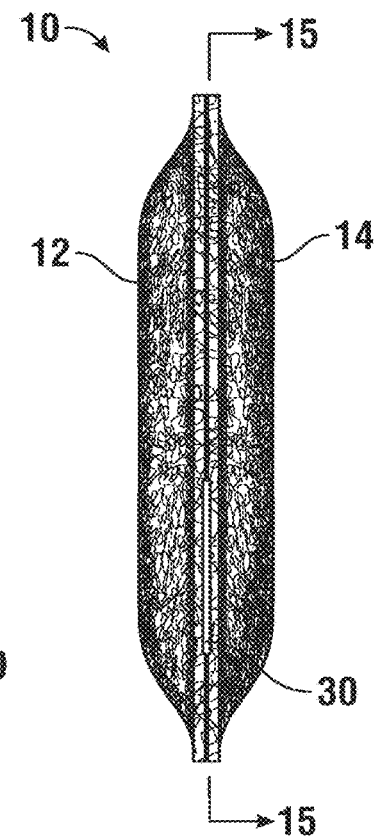
FIG. 10　　　　　　　FIG. 11
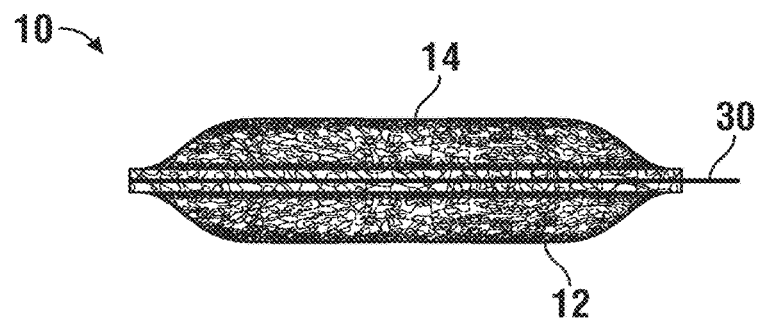
FIG. 12

LOOFAH DISH SPONGE AND METHODS OF MANUFACTURING THEREOF

CROSS-REFERENCE DATA

This patent application is a continuation-in-part and claims a priority benefit from the co-pending U.S. patent application Ser. No. 17/099,495 filed Nov. 16, 2020 by the same inventors and entitled "Loofah Sponge," the content of which is incorporated herein by reference in its entirety.

BACKGROUND

Without limiting the scope of the invention, its background is described in connection with a loofah sponge. More particularly, the invention describes environmentally friendly and recyclable loofah dish sponge designs and various methods for manufacturing a loofah dish sponge.

The use of natural, environmentally friendly, and renewable (zero-waste) materials and resources instead of synthetic components is an important trend in many industries, including cleaning supplies. Using natural and plant-based materials in making sponges offers numerous benefits over synthetic alternatives. Firstly, they are biodegradable, meaning that they break down naturally in the environment, reducing waste and reducing the impact on the planet. It further reduces or avoids releasing micro-plastics into the environment. This is especially important given the large number of sponges that are used and discarded every year.

Secondly, natural sponges are typically more sustainable and environmentally friendly to produce. For example, some natural sponge materials, such as loofah fibers, are harvested from plants in a sustainable manner, such as in one year, supporting farmers and the entire ecosystem where they grow. Other sponge materials require multiple years of harvesting, such as cellulose materials. In contrast to natural sponges, synthetic sponges are made from petroleum-based products, which are not renewable and require a lot of energy and other resources to produce them. After disposal, synthetic sponges contribute to petroleum-based waste that pollutes the environment in the form of microplastics and plastic waste in the oceans and landfills.

Finally, natural sponges are often more durable and long-lasting than synthetic sponges. One advantage of loofah sponges is that they do not get slimy or generate a bad odor like regular synthetic sponges do because they have larger pore sizes allowing them to drain more easily and dry out more quickly. This not only makes natural sponges more pleasant to work with and cost-effective in the long run but also helps reduce the amount of waste generated.

Loofah is a genus of tropical and subtropical vines in the cucumber family. In common usage, loofah refers to the fruits of the species *luffa aegyptiaca* and *luffa acutangula*. Loofah is cultivated in many parts of the world, including Asia and Africa. The fully developed fruit may be processed into a loofah sponge. A loofah sponge is a natural cleaning tool made from the fibrous skeleton of the mature fruit of a loofah plant.

The general process of making a loofah sponge involves several steps. First, the loofah plant is grown in a warm and humid climate and trained to climb up a trellis or support structure. When the loofah fruit is mature, it is harvested and left to dry in the sun for several weeks. Once the fruit is dry, it is soaked in water to soften the outer skin, which is then peeled off, and the seeds are removed. The remaining fibrous skeleton of the loofah fruit is cut into the desired size and shape for use as a sponge. The loofah sponge is then washed and dried before being packaged for sale.

The texture of loofah sponges is particularly well-suited for scrubbing or exfoliation. However, many conventional loofah sponges are only a single layer. With prolonged use, the conventional single-layer loofah sponge will deteriorate. Also, because it is flat and thin, it has poor ergonomics and is difficult to use.

Some conventional loofah sponges have multiple layers. Although they may have improved durability compared to conventional single-layer loofah sponges, these conventional multi-layer loofah sponges will also deteriorate with prolonged use. Furthermore, while the conventional multi-layer loofah sponge is thicker than the conventional single-layer loofah sponge, it is not thick enough to hold comfortably. Conventional multi-layer loofah sponges are also made with synthetic thread, making them not fully compostable. Moreover, the conventional multi-layer loofah sponge still has generally poor ergonomics because, like the conventional single-layer loofah sponge, it is flat.

The present invention addresses these, and other problems encountered in the past, and is directed to a loofah sponge having a floating layer inside of two cover layers attached with a recyclable plant-based thread. The loofah sponge, according to the present invention, provides superior durability and excellent ergonomics without using synthetic materials.

SUMMARY

Accordingly, it is an object of the present invention to overcome these and other drawbacks of the prior art by providing a novel loofah dish sponge with improved ergonomics and scrubbing performance.

It is another object of the present invention to provide a novel loofah dish sponge that is made from all-natural materials in an environmentally friendly manner.

It is a further object of the present invention to provide a loofah dish sponge that resists tearing and is sufficiently fluffy when wet.

It is a further object of the present invention to provide novel methods for manufacturing a superior environmentally-friendly loofah sponge for household cleaning.

The method of manufacturing a loofah dish sponge, according to the present invention, may include the following steps. First, a fully grown plant may be harvested, formed to be a fibrous skeleton, and sufficiently dried. It can then be subjected to bleaching in a water solution containing between 10 and 15 percent of bleach by volume for a duration of ½ hour to 2 hrs, such as to remove dark brown or black discoloration on the fibers. It is important not to expose the fibrous skeleton to bleaching for too long when the color changes from initial yellow to white or off-white. Such overexposure may damage the fibers and make the sponge less durable.

The fibrous skeleton may be dried after bleaching and then opened along one side thereof. It may then be unfolded. The core veins may be removed by cutting, and a flat outer skeleton may be produced as a result. The loofah may then be pressed minimally to flatten the sponge with a wooden press so that it dries in a flat state.

Three layers of the dish sponge may then be cut out from the fibrous skeleton, namely a first cover layer, an inner layer, and a second cover layer. These layers may be cut from the flat fibrous skeleton between the internal ridges thereof. These layers may be formed in a generally rectangular or oval shape. To fit into a small hand, these layers may be formed with a width between 3 and 4 inches and a length between 4 and 6 inches. While the first and the second cover layers may be made to have the same size, the inner layer may be cut to be smaller, for example, by about ½ inch, than the size of the first and second cover layers.

The inner layer may then be placed in the middle between the first cover layer and the second cover layer, which may be oriented to have their respective external sides facing away from the inner layer.

The first cover layer and the second cover layer may then be deformed when at least damp to bring their respective peripheral edges together, thereby creating a bulge in each of the first cover layer and the second cover layer. As a result, an internal volume is formed for the inner layer to be positioned between thereof. The peripheral edges of the first and the second cover layers may then be stitched together with a cotton thread with a minimum of about Tex 70 weight, thereby producing the loofah dish sponge of the invention.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 is a front view of the loofah dish sponge.
FIG. 3 is a side view of the loofah dish sponge.
FIG. 4 is a top view of the loofah dish sponge.
FIG. 10 is a top view of the same.
FIG. 11 is a first side view of the same.
FIG. 12 is a second side view of the same.

DETAILED DESCRIPTION OF PREFERRED EMBODIMENTS OF THE INVENTION

Figure 1:
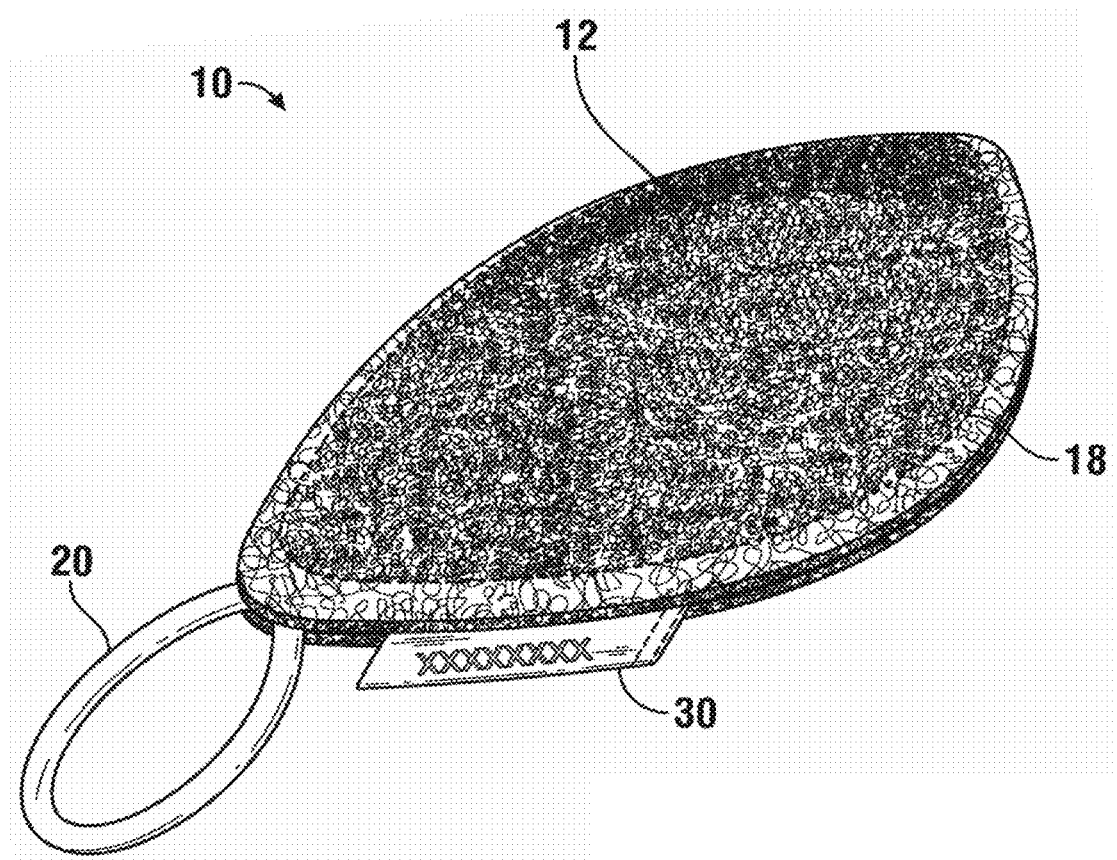
FIG. 1 is a perspective view of the loofah dish sponge.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 5:
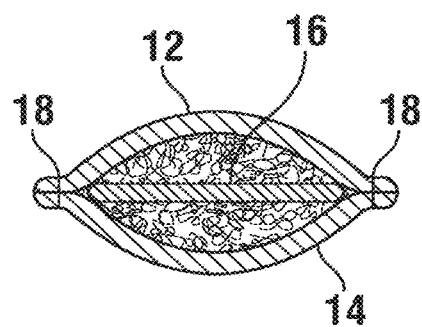
FIG. 5 is a cross-sectional view of the loofah dish sponge.
Figure 6:
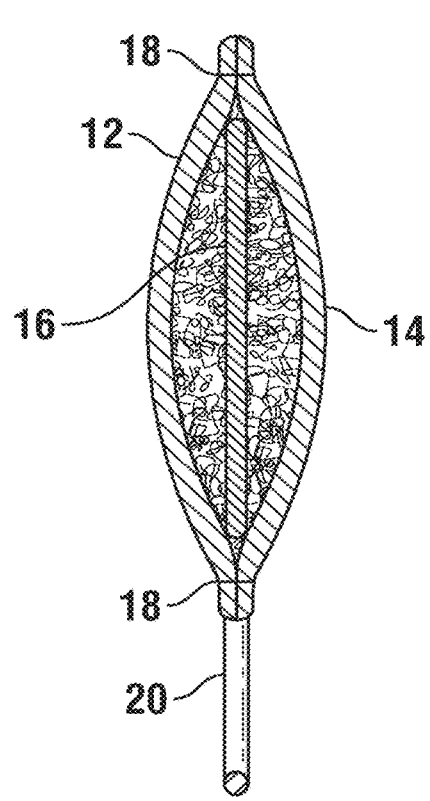
FIG. 6 is another cross-sectional view of the loofah dish sponge.
Figure 7:
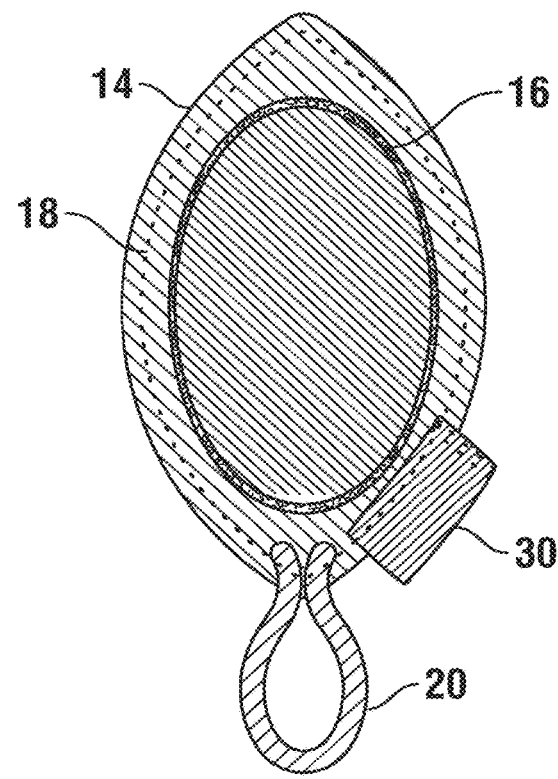
FIG. 7 is yet another cross-sectional view of the loofah dish sponge.
Figure 8:
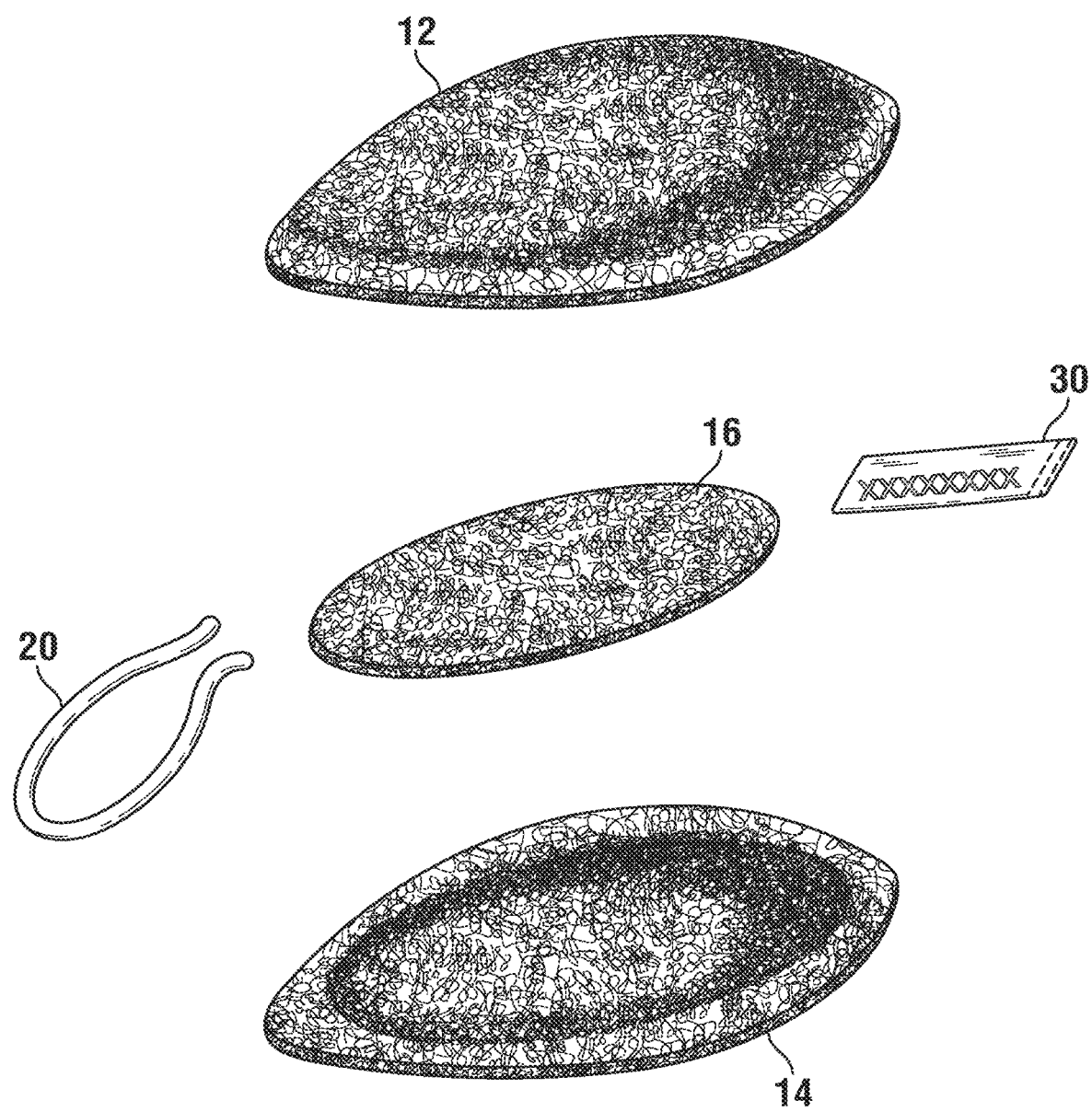
FIG. 8 is an exploded view of the loofah dish sponge.
Figure 9:
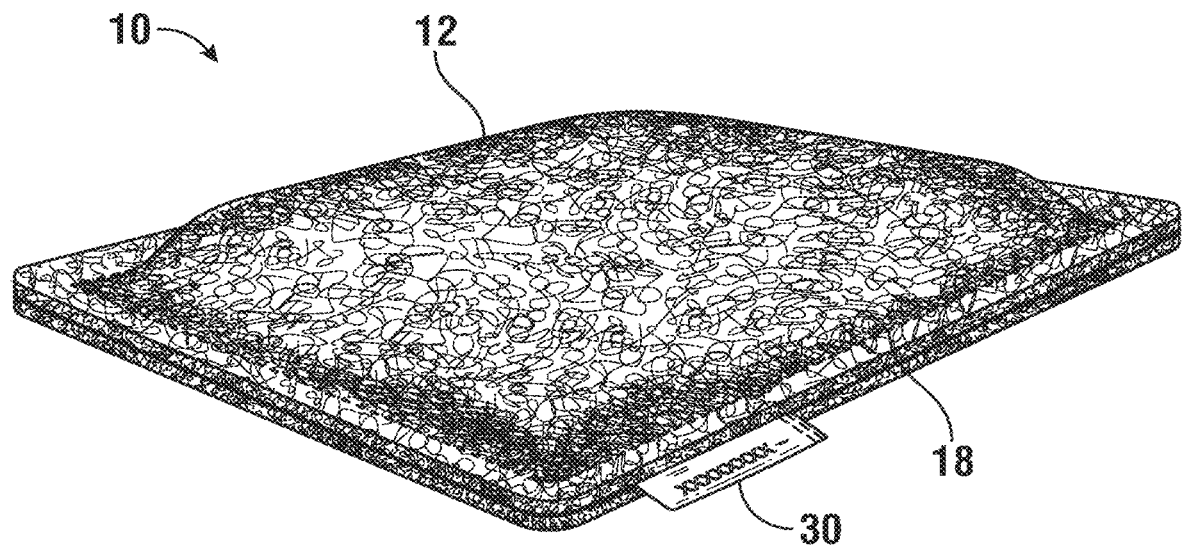
FIG. 9 is a perspective view of an alternative shape of the loofah dish sponge.
Figure 13:
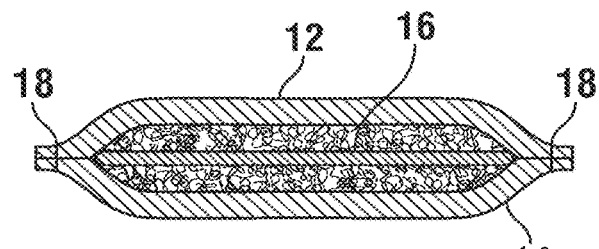
FIG. 13 is a first cross-sectional side view, as seen in FIG. 10.
Figure 14:
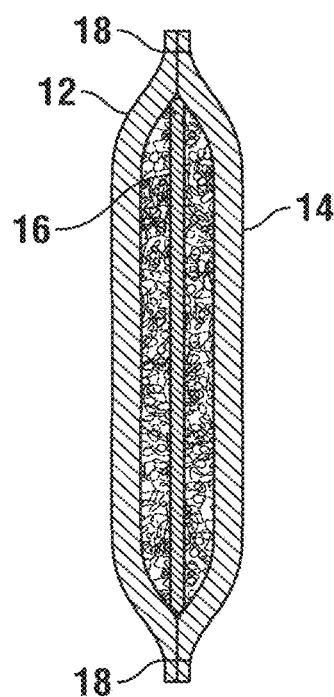
FIG. 14 is a second cross-sectional side view, as seen in FIG. 10.
Figure 15:
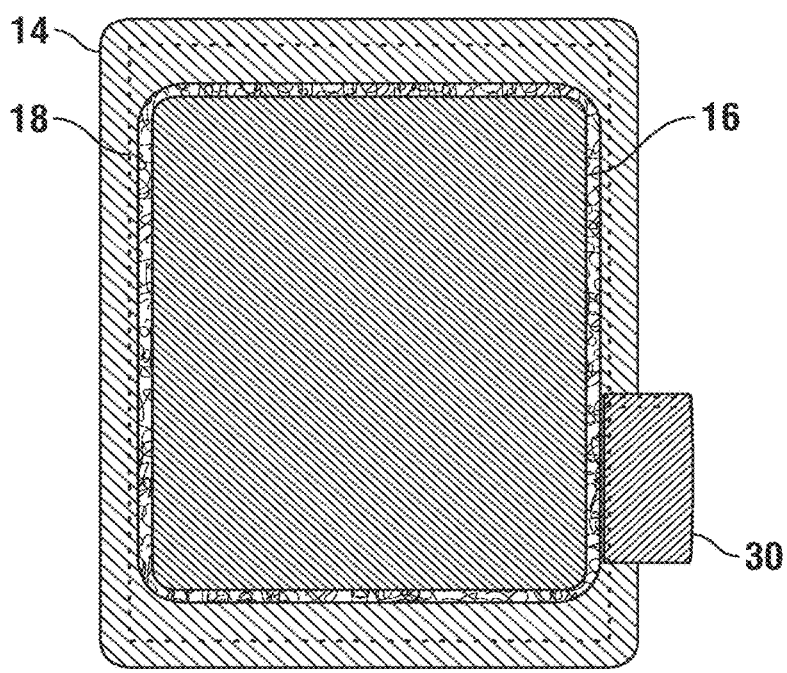
FIG. 15 is a top view with half of the sponge removed, as seen in FIG. 11.
Figure 16:
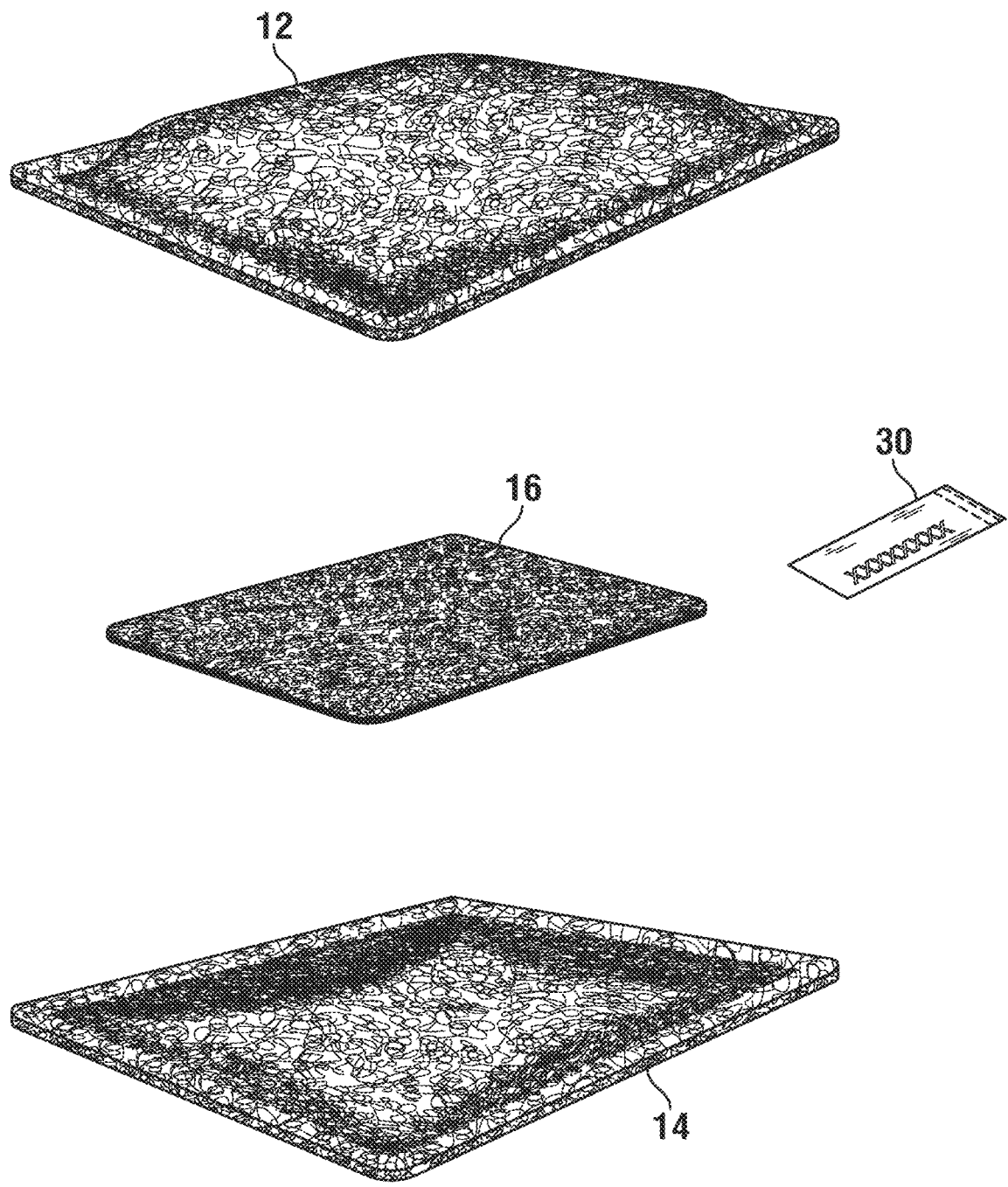
FIG. 16 is an exploded view of the same.

Referring to FIGS. 1-4, a loofah dish sponge 10 is provided. The loofah dish sponge 10 includes a first and a second cover layers 12 and 14, which are made only from natural loofah fibers. The first and second cover layers 12 and 14 are joined together by stitching 18 around their common peripheral edge. When assembled, the cover layers 12 and 14 are mirror images of each other. The cover layers 12 and 14 may be of any suitable shape for holding in one hand, such as square, rectangular, circular, oval-shaped (as seen in FIGS. 1-8), polygonal, or another shape. A generally rectangular shape with a width between 3 and 4 inches and a length between 4 and 6 inches is useful for using one hand to hold the dish sponge, as seen in FIGS. 9-16. For an oval shape, these dimensions may correspond to both respective diameters of an oval.

In some embodiments, a loop 20 may be included. The loop 20 enables a user to easily hang the loofah dish sponge 10 on a hook, finger, or another object. The loop 20 may be made of a string, such as a 5 mm cotton round flat braid three-strand cotton cord. This configuration allows the sponge to dry more quickly and may avoid forming a hard-to-dry area of the dish sponge which may lead to a formation and growth of a mold. The loop 20 may be disposed between the respective peripheral edges of the first and second cover layers 12 and 14. It may be fixedly attached in this location by the stitching 18. However, it is contemplated that the loop 20 may be positioned at any point along the peripheral edge formed by the first and second cover layers 12 and 14. In addition, or in other embodiments, multiple loops 20 may be used. In some embodiments, a tag 30 may be included.

Referring now to FIGS. 4-16, the loofah dish sponge 10 includes an inner layer 16, which is also made of natural loofah fibers. The inner layer 16 may be disposed in the internal volume formed by the first and second cover layers 12 and 14. The inner layer 16 may be rectangular- or oval-shaped, with approximately the same proportions of length to width as the first and second cover layers 12 and 14 and be about ¼ to ½ smaller in size than the first and second cover layers 12 and 14.

The inner layer 16 may not be fixed by stitching 18. Instead, the inner layer 16 'floats' inside the internal volume formed between the first and second cover layers 12 and 14. Each of the three layers of the loofah dish sponge 10 may have a thickness from about 3/16 inch to 3/8 inch, such as at least 3/16 inch, at least ¼ inch, at least 5/16 inch, or about 3/8 inch.

It has been found, surprisingly, that this configuration of the smaller inner layer 16 floating inside the internal volume formed by the first and second cover layers 12 and 14 provides superior durability. Furthermore, this configuration causes the first and second cover layers 12 and 14 to bulge outwards, which provides an ergonomic shape that is easy for the user to grip or hold. Because the inner layer 16 is typically only slightly less in size than the first and second cover layers 12 and 14, the outward force from the inner layer 16 is typically exerted near the peripheral edge of the dish sponge 10, thus providing an ergonomically curved exterior that yields under pressure but tends to restore its original shape once the pressure is removed.

In embodiments, each of the three layers of the loofah dish sponge 10 may be made from a single piece of loofah. In further embodiments, the inner layer may be made from two or three pieces of loofah floating inside the internal volume formed between the first and the second cover layers 12 and 14. Each of the pieces forming the inner layer 16 may be sized to be at least 1 inch long by 1 inch wide. Each of the two or three pieces of the inner layer may be positioned to not overlap an adjacent piece of loofah of the inner layer 16.

As mentioned above, all layers 12, 14, and 16 are made of natural loofah fibers. The loofah fibers are harvested with minimal use of chlorine and processed free of any additional chemicals that can harm them. The method of manufacturing the loofah dish sponge 10 is developed to produce the loofah dish sponge with superior durability and may include the steps described below.

Once the loofah plant is grown, it may be harvested and fully dried. It may be then initially trimmed to form a fibrous skeleton. The dried-out loofah skeleton may be bleached in a water solution containing between 10 and 15 percent of bleach by volume for a duration between 30 min and 120 min. It is important not to overbleach the fibrous skeleton in order to preserve the strength of the loofah fibers. One criterion to watch for is the color of the fibrous skeleton. Bleaching should only be used to remove some of the discoloration left from when the shell is removed and be stopped once the fibrous skeleton starts to turn its color. It is acceptable to have the color of the fibrous skeleton to be yellow. Care should be taken to avoid turning the skeleton color to white or off-white. The fibrous skeleton has an external side and the internal side, which later in the process will correspond to the external side and the internal side of the dish sponge cover layers.

The next step in the process is cutting the loofah fibrous skeleton open to unfold thereof. This may be done carefully to avoid compressing and compacting the fibers together in order to prevent their natural fluffy state. Once unfolded, the fibrous skeleton may be further processed by removing core fibers and forming a flat outer fibrous skeleton.

Cutting out a first cover layer, an inner layer, and a second cover layer may then be accomplished using the flat outer fibrous skeleton. To make the dish sponge more uniform, cutting these layers from the plant may be done between the natural ridges of the flat fibrous skeleton. Each layer may have a predetermined shape, for example, a shape of a rectangle or an oval, as described above. The external and internal side of the fibrous skeleton defines the corresponding external and internal side of the first cover layer 12 and the second cover layer 14. The inner layer 16 may also be cut out from the fibrous loofah skeleton and may be sized ½ inch to ¾ inch smaller than the first and second cover layers 12 and 14.

The next step is positioning the inner layer 16 between the first cover layer 12 and the second cover layer 14. The external side of the first cover layer 12 and the external side of the second cover layer 14 are both facing away from the inner layer 16 at this point.

Deforming the first cover layer 12 and the second cover layer 14 is done next, preferably while both of these layers are at least damp, which improves their flexibility and facilitates bringing the first peripheral edge of the first cover layer 12 next to the second peripheral edge of the second cover layer 14 together. This critical step forms a bulge in each of the first cover layer 12 and the second cover layer 14 due to the presence of the inner layer 16 therebetween. This action also forms an internal volume for the inner layer 16 to reside between the first and second cover layers 12 and 14.

The next step in the process is sewing the first peripheral edge to the adjacent second peripheral edge of the first and second cover layers 12 and 14. This step may be done using sufficiently strong and wide thread, such as cotton thread sized to be at least Tex 70 or larger, to avoid tearing and cutting the loofah dish sponge edges. It is preferred not to use any fabric ribbon to cover the stitching area in order to avoid hard-to-dry areas of the sponge and minimize the risk of growing a mold thereon. After the perimeter is sewn, the loofah fibers outside of the stitching are trimmed carefully to remove any excess fibers beyond a ⅛ in to ¼ in border outside of the perimeter stitching. Trimming the edge allows the sponge to have a rounded and finished edge look without compromising the stitching. A combination of the first peripheral edge and the second peripheral edge may be further compressed together, such as during the sewing step, to provide a firm peripheral edge making it easier to hold the sponge, while the interior remains fluffy. the firm peripheral edge is also useful for scraping harder-to-clean surfaces and corners of pots and pans. This step completes the basic manufacturing of the loofah dish sponge 10. In other embodiments, a tag 30 and/or a loop 20 may also be attached to the loofah dish sponge 10 during the step of stitching. The final loofah dish sponge may have a thickness between ¼ inch and ½ inch when dry.

As mentioned above, manufacturing and assembly steps may be done when the first cover layer 12 and the second cover layer 14 are at least damp and more deformable than if they are in a dry state, thereby easing the formation of the internal volume in between the first and the second layers 12 and 14. All manufacturing steps may also be done with care applied to prevent compacting natural loofah fibers together.

To further improve the fluffiness of the dish sponge, stitching is only used on the periphery of the sponge and never in the center of the sponge 10 away from the first peripheral edge and the second peripheral edge. This preserves the ability of the loofah dish sponge 10 to expand when wet, such as by at least 30 percent, at least 40 percent, at least 50 percent, at least 60 percent, or at least 70 percent beyond the initial dry thickness thereof.

When a cotton thread is used for sewing the loofah together, the entire product and all the components thereof are made from natural plant-based materials, thereby avoiding synthetic material and making the product to be environmentally friendly and easily compostable in a home or a commercial compost.

Use of any fabric cover or fabric strips is avoided during the manufacturing process, thereby facilitating producing a loofah dish sponge configured for rapid drying after use, which in turn, impedes mold growth.

The loofah dish sponge 10 may be used in the kitchen and the bathroom; it may be used to clean tableware, cookware, countertops, windows, mirrors, and much more. For cleaning applications, the user squeezes the loofah gently and applies soap to the loofah sponge 10. Next, the user softly exfoliates his or her body using the loofah sponge 10. After use, the loofah sponge 10 may be hung to dry using the loop 20. The loofah 10 is hard when dry, but becomes softer when wet.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of manufacturing a loofah dish sponge, comprising the following steps:
    (a) bleaching a dried-out loofah fibrous skeleton in a water solution containing between 10 and 15 percent of bleach by volume for a duration between 30 min and 120 min, and while the loofah fibrous skeleton remains yellow in color, wherein the loofah fibrous skeleton has an external side, an internal side, and ridges on at least one side,
    (b) cutting the loofah fibrous skeleton open to unfold thereof, followed by removing core veins and forming a flat outer fibrous skeleton,
    (c) cutting out a first cover layer, an inner layer, and a second cover layer from the flat outer fibrous skeleton, wherein cutting of the layers is done between the ridges of the flat fibrous skeleton, wherein the first cover layer and the second cover layer are made in a generally rectangular or an oval shape with a width between 3 and 4 inches and a length between 4 and 6 inches, the first cover layer and the second cover layer having an internal side corresponding to the internal side of the loofah fibrous skeleton and an external side corresponding to the external side of the loofah fibrous skeleton, and wherein the size of the inner layer is ½ inch to ¾ inch smaller than the corresponding size of the first cover layer and the second cover layer,
    (d) positioning the inner layer between the first cover layer and the second cover layer, wherein the external side of the first cover layer and the external side of the second cover layer are both facing away from the inner layer, (e) deforming the first cover layer and the second cover layer to bring a first peripheral edge of the first cover layer next to a second peripheral edge of the second cover layer together, thereby creating a bulge in each of the first cover layer and the second cover layer and forming an internal volume for the inner layer between thereof, and (f) sewing the first peripheral edge to the second peripheral edge without any fabric ribbon attached thereto, thereby producing the loofah dish sponge having a thickness between ¼ inch and ½ inch when dry, wherein steps (d) through (f) are done when the first cover layer and the second cover layer are at least damp and more deformable than in a dry state thereof.

2. The method of manufacturing the loofah dish sponge, as in claim 1, wherein the inner layer is made from a single piece of loofah.

3. The method of manufacturing the loofah dish sponge, as in claim 1, wherein the inner layer is made from two or three pieces of loofah, wherein each piece of loofah measures at least 1 inch in width and at least 1 inch in length and is positioned in step (d) to not overlap an adjacent piece of loofah.

4. The method of manufacturing the loofah dish sponge, as in claim 1, wherein no sewing or stitching is done in a central portion of the loofah dish sponge away from the first peripheral edge and the second peripheral edge, thereby preserving the ability of the loofah dish sponge to expand when wet by at least 30 percent beyond the dry thickness thereof.

5. The method of manufacturing the loofah dish sponge, as in claim 1, wherein a thread used in step (f) is selected to be made from cotton and to be at least Tex 70 in size, thereby avoiding ripping or cutting across the first peripheral edge or the second peripheral edge.

6. The method of manufacturing the loofah dish sponge, as in claim 5, wherein all components thereof are made from natural plant-based materials, thereby avoiding using any synthetic materials.

7. The method of manufacturing the loofah dish sponge, as in claim 1, wherein the loofah dish sponge is manufactured without using any fabric, thereby facilitating rapid drying thereof and impeding mold growth.

8. An environmentally friendly three-layer loofah dish sponge produced according to claim 1, herein all components of the loofah dish sponge are made from natural plant-based materials.

9. The three-layer loofah dish sponge, as in claim 8, wherein each loofah layer is from ³⁄₁₆ inch to ⅜ inch thick.

10. The loofah dish sponge, as in claim 8, wherein the inner layer is not attached to either the first cover layer or the second cover layer.

\* \* \* \* \*